Patented Apr. 24, 1923.

1,453,003

UNITED STATES PATENT OFFICE.

GEORGE A. COLETTE, OF BLANCHARD, WASHINGTON.

AUTOMOBILE POLISH.

No Drawing.    Application filed September 21 1922.   Serial No. 589,705.

*To all whom it may concern:*

Be it known that I, GEORGE A. COLETTE, a citizen of the United States, and a resident of Blanchard, in the county of Skagit and State of Washington, have invented a new and useful Automobile Polish, of which the following is a specification.

The object of my invention is to produce a liquid of a mild acid nature and also oleaginous which, when spread over a polished or painted metallic, gum or other painted surface, will dislodge the dirt therefrom, fill the small cracks in the surface, cover the surface with an oleaginous film, supply fatty material to the gum and pigment and restore the surface to its original glossy nature.

My composition consists of a mixture of cider vinegar, olive oil and corn oil.

In preparing the composition I prefer to use the ingredients in about the following proportions—viz, two parts of said cider vinegar, one part of said olive oil and one part of said corn oil, thoroughly shaken together each time before using.

I claim:

1. A composition of acetic acid, olive oil and corn oil adapted for covering painted or varnished surfaces with a thin, oleaginous film.

2. A composition of two parts of cider vinegar, one part of olive oil, and one part of corn oil.

GEORGE A. COLETTE.